(12) United States Patent
Narui et al.

(10) Patent No.: US 7,945,923 B2
(45) Date of Patent: May 17, 2011

(54) DISC DEVICE

(75) Inventors: Yoichi Narui, Matsudo (JP); Goshi Shiroishi, Tokyo (JP); Ikuo Nishida, Ebina (JP); Kenji Watabe, Yokohama (JP); Masahiro Matsuo, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 907 days.

(21) Appl. No.: 11/859,008

(22) Filed: Sep. 21, 2007

(65) Prior Publication Data
US 2008/0209457 A1 Aug. 28, 2008

(30) Foreign Application Priority Data
Feb. 27, 2007 (JP) .................. 2007-047851

(51) Int. Cl.
*G11B 7/135* (2006.01)
(52) U.S. Cl. .................................... 720/652
(58) Field of Classification Search .................... 720/652
See application file for complete search history.

(56) References Cited

U.S. PATENT DOCUMENTS

| 6,781,826 | B1 * | 8/2004 | Goldstone et al. | 361/679.33 |
| 7,163,422 | B2 * | 1/2007 | Amano et al. | 439/638 |
| 7,375,960 | B2 * | 5/2008 | Blaalid et al. | 361/679.33 |
| 7,517,231 | B2 * | 4/2009 | Hiew et al. | 439/76.1 |
| 7,576,990 | B2 * | 8/2009 | Ni et al. | 361/737 |
| 7,768,789 | B2 * | 8/2010 | Ni et al. | 361/737 |
| 2008/0089020 | A1 * | 4/2008 | Hiew et al. | 361/684 |

FOREIGN PATENT DOCUMENTS

| JP | 60-263370 | 12/1985 |
| JP | 2001-101829 | 4/2001 |
| JP | 2006-099859 | 4/2006 |

* cited by examiner

*Primary Examiner* — Mark Blouin
(74) *Attorney, Agent, or Firm* — Antonelli, Terry, Stout & Kraus, LLP.

(57) ABSTRACT

The invention provides a disc device capable of offering good SATA interface performance by optimizing the placement of the SATA connector relative to the control board, solving problems concerning noise or unnecessary radiation.

A driver IC and DSP for executing main processing concerning disc recording or reproduction processing are installed in a main printed circuit board. A SATA connector having a power supply terminal and signal terminal is fixed to the main printed circuit board. The SATA connector is placed on the board opposite the DSP. Patterns each connecting the power supply terminal to the driver IC and connecting the signal terminal and DSP are formed on the board. The SATA connector and DSP are placed on the driver IC side relative to the central line of the board, the power supply terminal is placed on the driver IC side, and the signal terminal is placed on the DSP side.

5 Claims, 7 Drawing Sheets

DISC DEVICE

CROSS-REFERENCE TO RELATED APPLICATIONS

This application relates to and claims priority from Japanese Patent Application No. 2007-047851, filed on Feb. 27, 2007 the entire disclosure of which is incorporated herein by reference.

BACKGROUND

1. Field of the Invention

The invention relates generally to a disc device having a processing mechanism for executing recording or reproduction processing on a disc.

2. Description of Related Art

Currently, parallel ATAs (PATAs) are mainly used as interfaces for connecting a disc device to a personal computer. A PATA interface connector includes a separate power supply unit, and a separate signal unit, each of which is installed on a main printed circuit board at the back end of an optical disc device.

Plural control ICs are installed in a control board and contained in a disc device. A DSP for controlling an entire disc device is put at the center of the main printed circuit board. A voltage regulator IC, flash memory IC, analog front end IC (AFE) for processing pickup signals, and mechanism driver IC for rotating a disc have to be efficiently arranged around a DSP in light of efficiency in wiring patterns formed between those ICs and the DSP.

FIG. 5 in JP2006-99856 A discloses an invention including plural ICs efficiently arranged on a printed circuit board. Since a motor driver is positioned at a corner opposite a power supply unit in a serial ATA interface connector via a HDC/MPC, a pattern from a power supply unit to a driver IC is formed in an X-Y direction using an end area of the main printed circuit board.

JP2001-101829 A discloses a floppy disc device having an interface connector and being downsized and thinned by arranging connectors and IO terminals, which may cause noise in other components or signal crossing, as far apart as possible in a control circuit board.

JP60-263370 A discloses arranging, in a floppy disc device, a recording or reproduction circuit and a motor control circuit as far apart as possible to avoid the effects of noise.

Recently, serial ATA (SATA) interfaces that enable high speed serial data transfer have been used, instead of the PATAs, as interfaces for connecting optical disc devices as typified by CD or DVD devices to a personal computer.

Data transfer using SATA interfaces is more susceptible to pattern impedance in a control main printed circuit board or noise caused by wires, etc., compared with data transfer using PATAs. For example, if a wiring pattern between a power supply unit in a SATA connector and a driver IC becomes long, the generated noise will affect the SATA interface performance. The same problem occurs in the case where a wiring pattern between a driver IC and a connector for a motor, or similar, driven by the driver IC is long.

Arranging a power supply unit in a SATA connector and a driver IC very close to each other is conceivable, but pattern impedance problems occur if the distance from a signal unit in the SATA connector and a DSP becomes long. To solve those problems, an object of the invention is to provide a disc device capable of offering good SATA interface performance by optimizing the placement of a SATA connector with respect to a control board to solve problems concerning noise or unnecessary radiation.

SUMMARY

To achieve the above object, the invention provides a disc device having a processing mechanism for executing recording or reproduction processing on a disc, the processing mechanism including: a control board in which a driver IC for driving a mechanism motor, and a main control IC for executing main processing concerning the disc recording or reproduction are installed; and a SATA connector having a power supply unit and a signal unit, the SATA connector being connected to the driver IC and the main control IC and provided to the control board opposite the main control IC, wherein a pattern connecting the power supply unit to the driver IC and a pattern connecting the signal unit to the main control IC are formed on the control board; and in the control board, the SATA connector and the main control IC are placed on the driver IC side relative to a line passing through the center of the control board, the power supply unit is also placed on the driver IC side, and the signal unit is placed on the main control IC side.

In the disc device of the invention, plural connectors connected to the power supply unit directly or via the driver IC are placed in a concentrated manner near the driver IC on the same side as the driver IC in the control board, using both faces of the control boards. In particular, the connectors include a connector for a photosensor that detects a special pattern formed on a label side of an optical disc.

The disc device of the invention also includes: a carrier mechanism having a spindle motor for rotating an optical disc, an optical pickup for executing recording or reproduction processing on the optical disc, and a carrier motor for moving the optical pickup towards or away from the center of the disc, each being fixed to a chassis; and a loading mechanism for carrying a tray that receives the optical disc into the disc device. The carrier mechanism is designed to move the optical disc carried into the disc device upwards relative to the tray to fix the optical disc to the spindle motor. A connector for the spindle motor and the photosensor connector are placed on the lower surface of the control board, and a connector for the loading mechanism is placed on the upper surface of the control board.

As described above, the invention achieves provision of a disc device capable of offering good SATA interface performance by optimizing the placement of the SATA connector relative to the control board to solve problems concerning noise or unnecessary radiation.

Other aspects and advantages of the invention will be apparent from the following description and the appended claims.

DETAILED DESCRIPTION OF PREFERRED EMBODIMENTS

Figure 1:
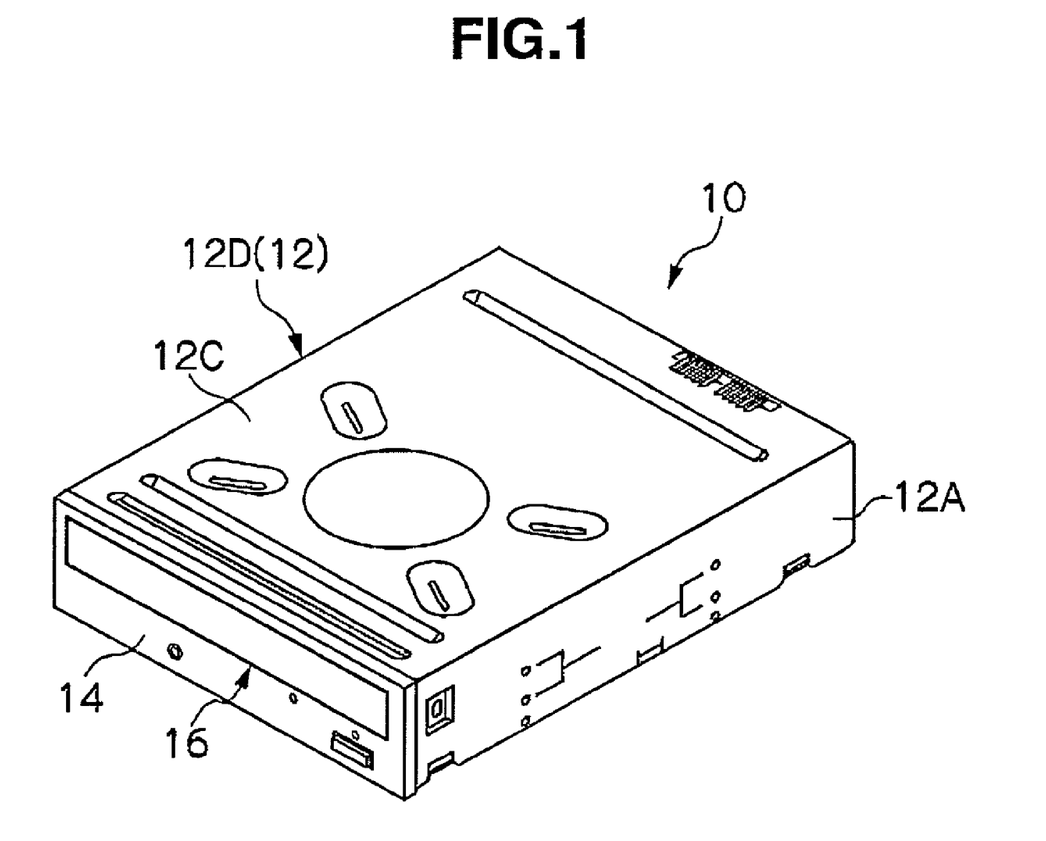
FIG. 1 is a perspective view of the entire disc device viewed from a viewpoint in front of the disc device of the invention.
Figure 2:
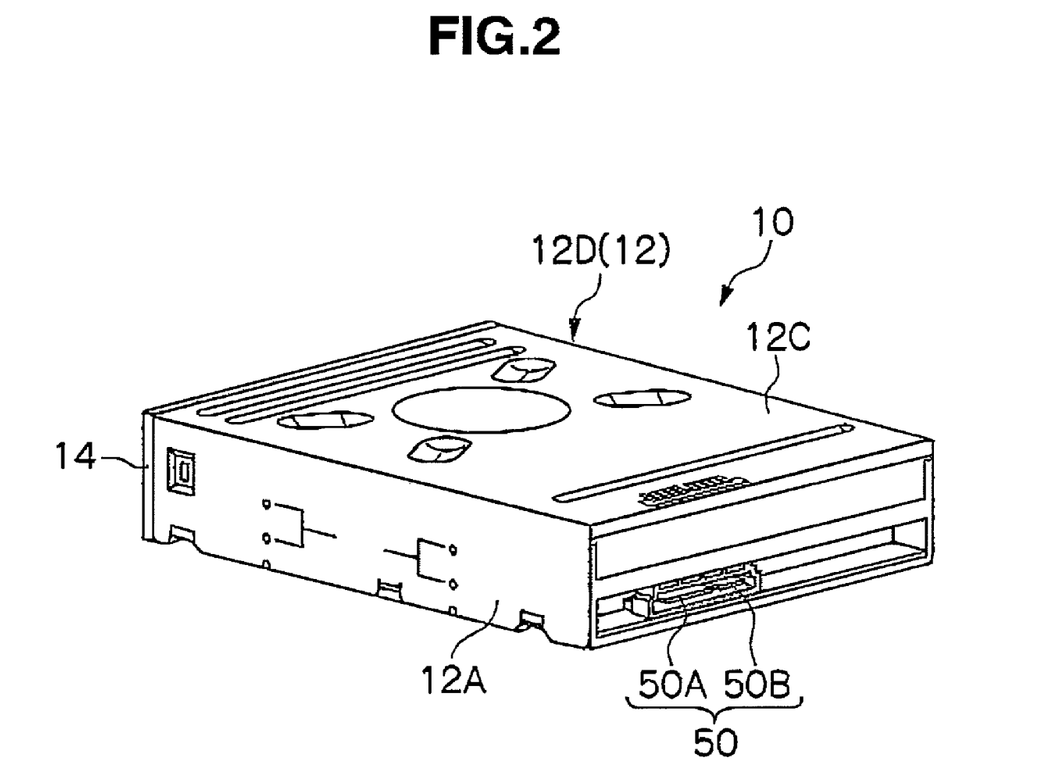
FIG. 2 is a perspective view of the entire disc device viewed from a viewpoint at the back of the disc device.

An embodiment of the disc device of the invention will be described below. FIGS. 1 and 2 are perspective views of the entire disc device viewed from the front and back of the disc device respectively. The disc device 10 has, within a box-shaped case, a processing mechanism for executing recording or reproduction processing on an optical disc. The details of the processing mechanism will be described later with reference to FIG. 3. The box-shaped case 12 is formed by engaging a base plate 12B with a metallic upper case 12D formed by a top plate 12C and a side plate 12A that are integrally molded. The processing mechanism is provided within the case.

The disc device 10 includes a front panel 14 that covers an open end in the front face of the case 12 and a tray 16 for inserting an optical disc into the disc device or ejecting a disc from the disc device. A SATA connector 50 that functions as an external I/F connector is exposed on the back face of the disc device. Reference numerals 50A and 50B represent a power supply terminal and a signal terminal in the SATA connector 50 respectively. After the disc device is inserted into the main body of a personal computer, the SATA connector 50 is connected to a power supply terminal and signal terminal in the personal computer.

Figure 3:
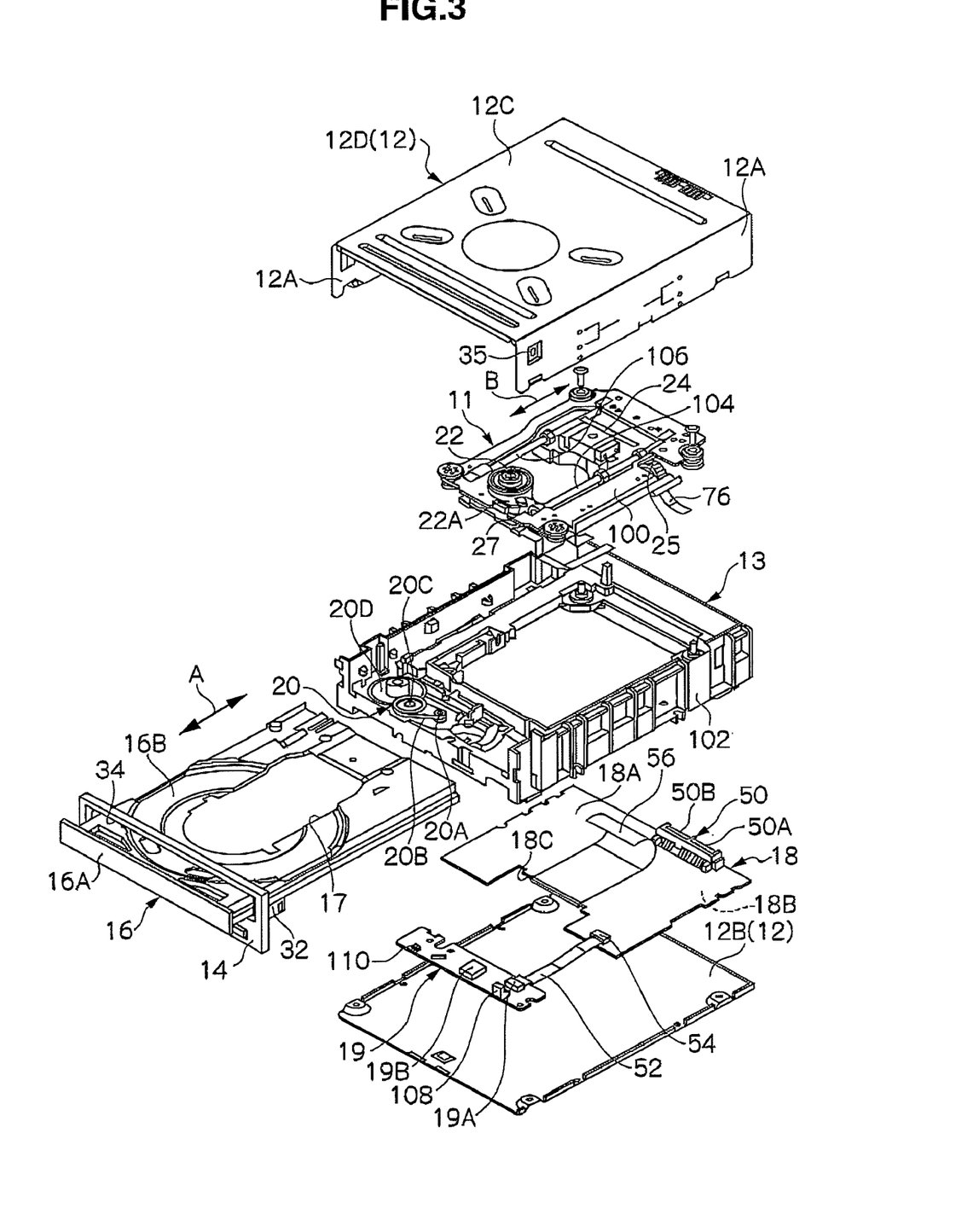
FIG. 3 is an exploded perspective view of main component assemblies of the disc device.

FIG. 3 is an exploded perspective view showing the main component assemblies of the disc device. The main components are assembled in the disc device in the positional relationship shown in FIG. 3. Reference numeral 11 represents a component called a carrier mechanism, in which an optical pickup 24 and a spindle motor 22A for rotating a disc are fixed to a chassis 100.

The chassis 100 is supported by a case 102 of a loading mechanism 13, which will be described later. A main printed circuit board 18 and a sub-printed circuit board 19 are also fixed to the case 102. The processing mechanism of the invention is a collective term for the parts including the carrier mechanism 11, the loading mechanism 13, the main printed circuit board 18, and the sub-printed circuit board 19.

Each of the left and right ends of the front panel 14 is provided with a small piece 32 that protrudes towards the carrier mechanism 11. The tip of the small piece 32 has a nail that engages, inside the side plate 12A, with a hole 35 provided on the front panel side in the side plate 12A.

The tray 16 moves, via an opening 34 in the front panel 14, towards/away from the disc device in the direction of arrow A in FIG. 3. Reference numeral 13 represents the loading mechanism 13 that moves the tray 16 towards/away from the disc device. The loading mechanism 13 includes a pulley 20C the rotation of a rotatable shaft in a loading motor 20A is transmitted to by a belt 20B, and a gear 20D rotated by the pulley 20C. The loading motor 20A is a driving source for moving the tray towards/away from the disc device. The loading mechanism 13 also has a mechanism for swinging the front panel 14 side of the carrier mechanism 11 up and down with respect to its base end, and fixing/releasing an optical disc to/from a turntable 22. Driving voltage is supplied to the loading motor 20A and the mechanism for swinging the carrier mechanism 11 from the main printed circuit board 18 via the sub-printed circuit board 19, which will be described later.

The tray 16 includes a plate 16B a disc is put on, and a front bezel panel 16A that covers the opening 34 in the front panel 14. Reference numeral 17 represents an opening formed in the plate 16B. Reference numeral 22 represents the turntable in the carrier mechanism 11 that supports an optical disc to enable rotation of the optical disc. A disc is chucked between the turntable 22 and a disc clamp provided on the back face of the top plate 12C.

After a disc is put on the plate 16B and the tray 16 is inserted into the device, the carrier mechanism 11 moves the turntable 22 upwards beyond the opening 17, lifts the disc put on the tray 16, and fixes the disc to the turntable 22 with the clamp on the back face of the top plate 12C to enable rotation of the disc. The turntable 22 is rotated by the spindle motor 22A in the carrier mechanism 11. Reference numeral 24 represents an optical pickup unit (optical unit), which moves in the direction of arrow B in FIG. 3 when driven by the carrier motor 25. As described above, the carrier mechanism 11 is configured to support, with the chassis 100, the spindle motor 22A, the optical pickup unit 24, and the mechanism for carrying the optical pickup unit towards or away from the center of the optical disc. The name of the "carrier mechanism" comes from the optical pickup carrying function. The optical pickup unit 24 is supported by a main shaft 104 and sub-shaft 106 and moved forward/backward along those shafts 104 and 106 by a lead screw provided on the shaft of the carrier motor 25.

A photosensor 27 for enabling a "write scribe" function is attached near the spindle motor 22A. The write scribe function is a function for coloring and drawing patterns on a specially-treated label side of an optical disc by projecting laser light from the optical pickup to the label side. The photosensor 27 is designed to detect the patterns that are vertical stripes drawn on the label side of the optical disc and detect the position of the optical pickup in the direction of rotation of the optical disc's label side.

The total area of the recording side (the lower surface seen from FIG. 3) of the disc can be scanned with light beams emitted from the optical pickup 24 by controlling the turntable 22's rotation and the optical pickup 24's movement towards/away from the center of the disc, and this enables recording or reproduction of information.

The main printed circuit board 18 includes various control ICs for controlling a driving unit for the carrier mechanism 11 and the loading mechanism 13 to achieve recording of information to an optical disc, reproduction of information, and the write scribe function. The main printed circuit board 18 is connected to the sub-printed circuit board 19. The sub-printed circuit board is provided on the side of the front end of the optical disc device, where the front panel 14 is, relative to the main printed circuit board 18. The sub-printed circuit board 19 is designed to control the loading mechanism 13, e.g., controls driving of the loading motor 20A. The sub-printed circuit board 19 has a mechanical detection switch 19B for detecting the open/closed tray position to ascertain the tray 16's open/closed status, an optical disc ejection switch 108, and a LED 110 for indicating the disc device operation status.

A connector 54 for the sub-printed circuit board 19 is provided on the upper surface 18A of the main printed circuit board 18 at the front right side in FIG. 3. A connector 19A in the sub-printed circuit board 19 and the connector 54 are connected with a flexible flat cable 52 for transmission of a control signal.

Examples of installation of various control ICs in the main printed circuit board 18 will be described. Reference numerals 18A and 18B represent the upper and lower surfaces of the main printed circuit board 18 respectively As shown in FIG. 3, the SATA connector 50 is fixed to the back end of the upper surface 18A. The SATA connector 50 functions as an external I/F connector. A single SATA connector has the power supply terminal 50A and signal terminal 50B, each being designed to be connected to connectors from the personal computer the disc device is inserted into.

The front end of the main printed circuit board 18 has a rectangular cut portion 18C in the middle in its width direction. A pickup connector 24A (see FIGS. 4 and 5) is provided near the cut portion 18C in the lower surface 18B and is connected to a flexible flat cable (FPC cable or FFC cable) 56 that can cope with the above described movement of the optical pickup unit.

Figure 4:
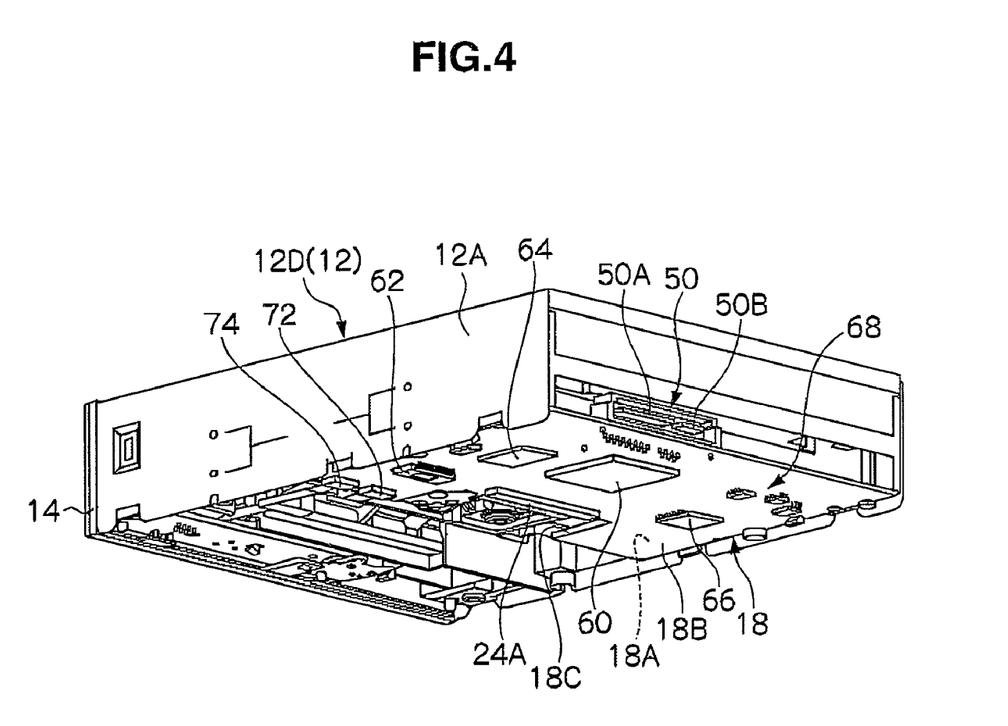
FIG. 4 is a perspective view of the lower surface of the disc device viewed from a lower viewpoint in front of the disc device with the bottom plate of the case omitted.
Figure 5:
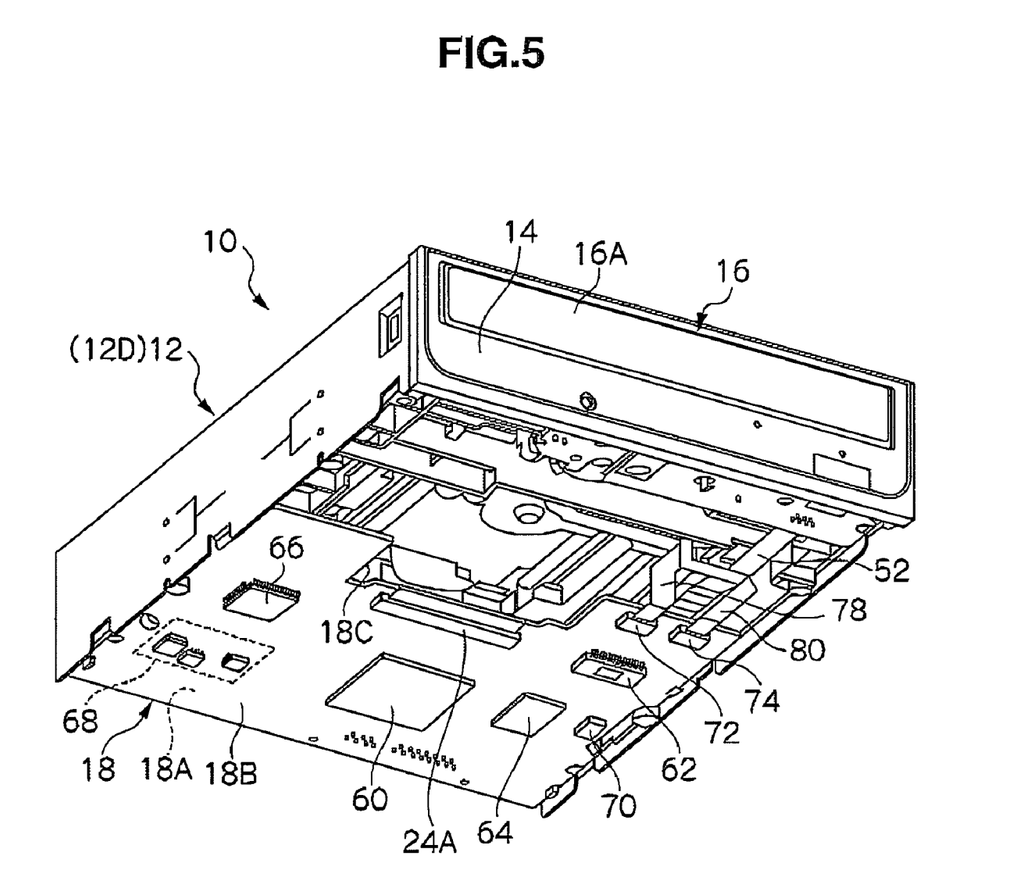
FIG. 5 is a perspective view of the lower surface of the disc device viewed from a lower viewpoint at the back of the disc device with the bottom plate of the case omitted.

The flexible flat cable 56 can be freely bent. When the optical pickup unit 24 moves towards or away from the center of the optical disc, the flexible flat cable 56 bends according to the change in the relative distance between the main printed circuit board 18 and the optical pickup unit 24.

FIGS. 4 and 5 are perspective views showing the lower surface 18B in the disc device viewed from an oblique lower viewpoint with the bottom plate 12B of the case 12 omitted. As shown in FIG. 4, the SATA connector 50 fixed to the upper surface 18A of the main printed circuit board 18 is exposed at the back end of the optical disc device.

Figure 6:
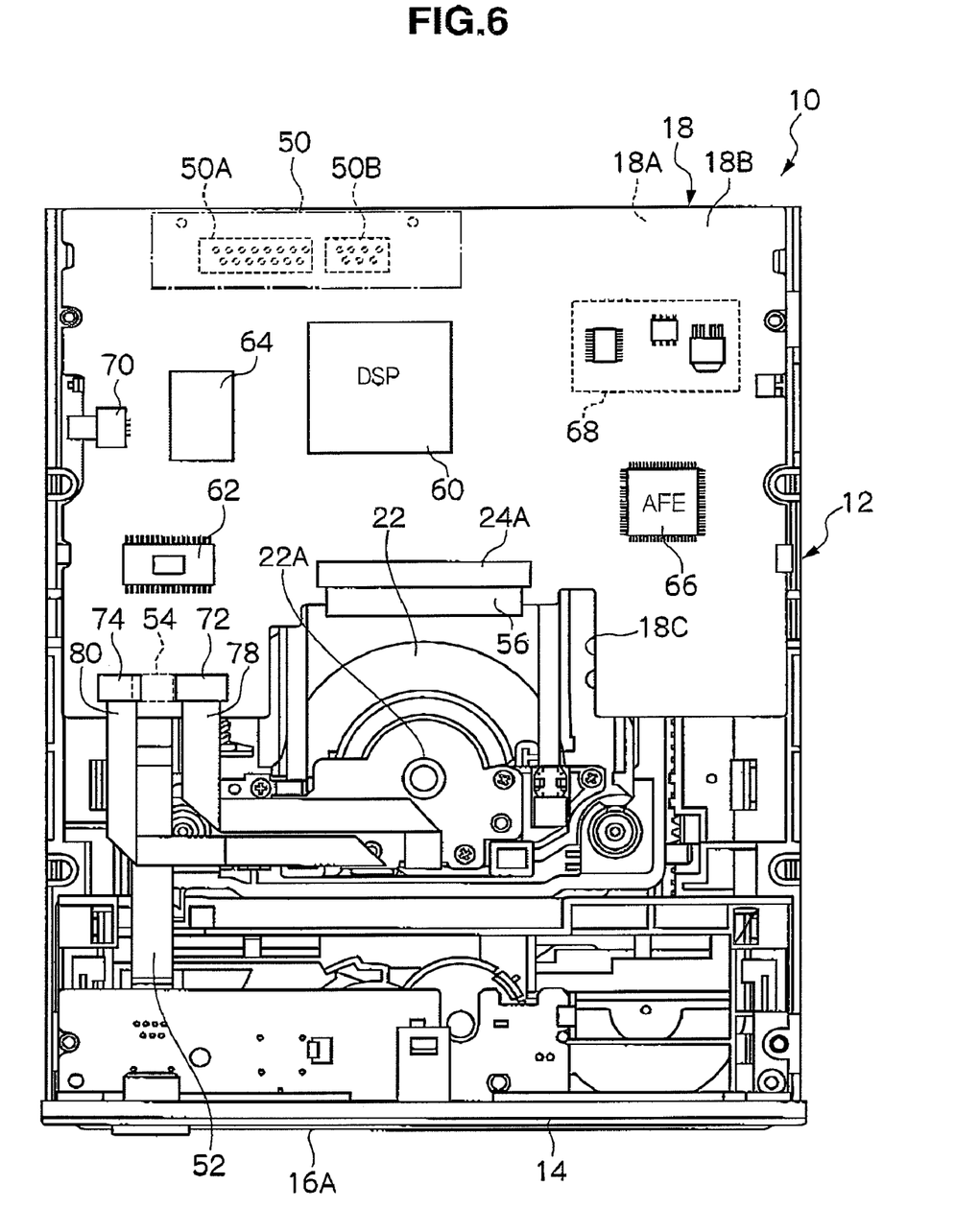
FIG. 6 is a bottom view of the disc device with the bottom plate of the case omitted.
Figure 7:
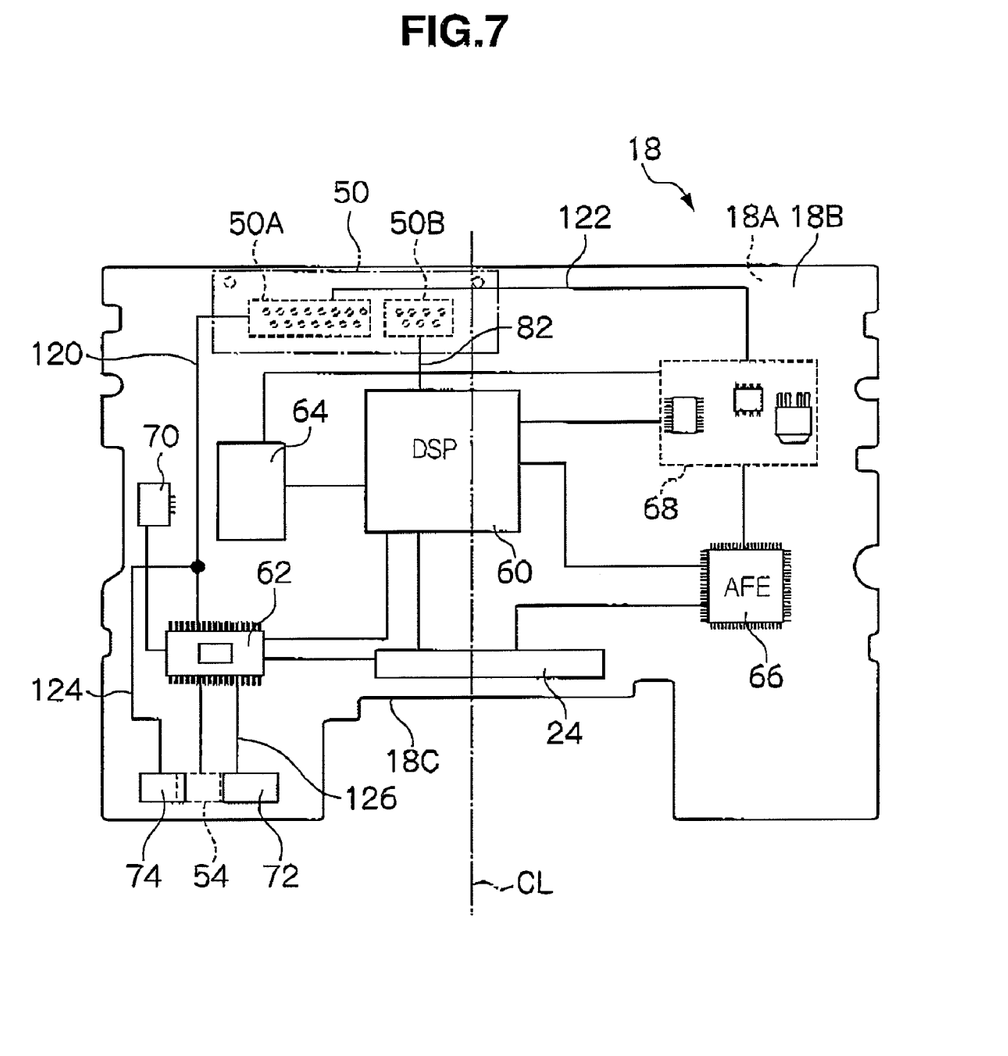
FIG. 7 is a bottom view of the main printed circuit board with an outline of an inter-device connection pattern added.

FIG. 6 is a bottom view of the disc device 10 illustrating the lower surface 18B of the main printed circuit board 18 with the bottom plate 12B omitted. FIG. 7 shows the lower surface 18B of the main printed circuit board 18 with an outline of a connection pattern between the elements added.

A DSP 60 in the middle of the board, a driver IC 62, a flash memory 64, an AFE 66, a regulator unit 68, a carrier motor connector 70, a spindle connector 72, and a photosensor connector 74 are installed on the lower surface 18B of the main printed circuit board 18. As has been already described, the SATA connector 50 and the connector 54 for connection with the sub-printed circuit board 19 are installed on the upper surface 18A of the main printed circuit board 18.

The DSP (digital signal processor) 60 is a basic IC connected to, and for controlling, the other control ICs (described later), and executing main processing for disc recording or reproduction. The DSP 60 uses a memory area in the flash memory 64 to control the carrier mechanism 11 and the loading mechanism 13 and execute main processing such as signal processing accompanying disc recording or reproduction. The DSP 60 is larger than the other ICs, and is put in the middle of the main printed circuit board 18 to best control the other ICs.

The driver IC 62 is designed to supply driving voltage for drive control to the loading motor 20A that is a driving system for the loading mechanism 13, the spindle motor 22A that is a driving system for the carrier mechanism 11, and the mechanism motors such as the carrier motor 25 for the optical pickup unit 24.

The flash memory 64 is designed to temporarily store information to be recorded to the disc and information read from the disc. The AFE 66 executes processing for shaping a signal detected from a disc to convert it into a digital signal. The regulator unit 68 is designed to adjust input voltage to supply optimum voltage to each IC. The carrier motor connector 70 is connected, via the flexible flat cable 76 (see FIG. 3), to the carrier motor 25 for the optical pickup.

As shown in FIG. 6, the spindle motor connector 72 in the lower surface 18B of the main printed circuit board 18 is connected to the spindle motor 22A via the flexible flat cable 78. Similarly, the photosensor connector 74 is connected to the photosensor 27 via the flexible flat cable 80. The flexible flat cables 78 and 80 are bent at right angles in the middle and extend widthwise towards the center of the main printed circuit board 18 The flexible flat cable 78 is connected to the spindle motor 22A, and the flexible flat cable 80 is connected to the photosensor 27 near the spindle motor 22A.

Since all electric components installed in the above described carrier mechanism 11 and loading mechanism 13 are controlled by the main printed circuit board 18, the main printed circuit board 18 has the control ICs for controlling those electric components and connectors for connection with them. An example of installation of the control ICs, etc., on the main printed circuit board 18 will be described below according to FIG. 7. As has been already described, the DSP 60 is located almost at the center of the lower surface of the main printed circuit board 18. Next, the voltage regulator 68 is installed to one side of the DSP 60. In the example shown in FIG. 7, the voltage regulator 68 is installed on the right with respect to a central line CL of the main printed circuit board 18.

The flash memory 64 has many terminals to be connected to the DSP 60, and the wiring pattern between the flash memory 64 and the DSP 60 becomes dense. Therefore, the flash memory 64 is installed on the side opposite the side where the voltage regulator 68 is installed with respect to the DSP 60. Since the wiring pattern formed between the AFE 66 and the DSP 60 is also dense, the AFE 66 is installed on the side opposite the flash memory 64 with respect to the DSP 60, i.e., on the same side as the regulator 68. However, the AFE 66 is located closer to the front end of the main printed circuit board 18 than the regulator 68 to avoid the regulator 68. Next, the driver IC 62 is installed on the side where the flash memory 64 is installed, closer to the front end of the lower surface 18B of the main printed circuit board 18 to avoid the flash memory 64. The connector 24A for the optical pickup unit 24, which has many terminals, is installed close to the front end of the lower surface 18B of the main printed circuit board 18, forming an almost right angle with the central line CL. The lengthwise direction of the connector 24A is parallel to the widthwise direction of the main printed circuit board 18. The central line CL is a central line of the main printed circuit board 18 relative to its width.

The carrier motor connector 70 is provided between the flash memory 64 and the left end of the lower surface 18B of the main printed circuit board 18. The SATA connector 50 is installed on the upper surface 18A of the main printed circuit board 18 at the position shown in FIG. 7. The SATA connector 50 is provided at the back end of the upper surface 18A of the main printed circuit board 18, to the side of the driver IC 62 with respect to the central line CL. The power supply terminal 50A in the SATA connector 50 is located to the side of the driver IC 64, and the signal terminal 50B is located at a position facing the DSP 60 in line widthwise with the power supply terminal 50A on the main printed circuit board 18.

By installing the SATA connector 50 at the above described position in the main printed circuit board 18, the pattern length of the power supply pattern 120 formed between the power supply terminal 50A and the driver IC 62 can be further shortened. Since the driver IC in particular supplies driving voltage to the driving systems, noise may occur if the pattern length between the driver IC 62 and the power supply terminal 50A is long.

Meanwhile, since the SATA connector 50 is located on the driver IC side, the pattern length of the pattern 122 formed between the power supply terminal 50A in the SATA connector 50 and the voltage regulator 68 may become long. However, since voltage supply from the voltage regulator 68 is directed to the control ICs, the problem concerning noise is less significant compared to the driver IC. Accordingly, as shown in FIG. 7, the SATA connector 50 is installed on the driver IC 62 side in the upper surface 18A of the main printed circuit board 18.

The pattern length of the pattern formed between the signal terminal 50B in the SATA connector 50 and the DSP 60 is preferably as short as possible in order to reduce noise. To this end, the pattern 82 from the signal terminal 50B to the DSP 60 could be shortened to its shortest length by positioning the DSP 60 at a position slightly closer to the driver IC 62 side with respect to the central line CL of the main printed circuit board 18. In other words, the pattern 82 can be formed as a straight line along the central line CL. According to the SATA standard, the pattern impedance between the SATA signal terminal in the SATA connector and the DSP terminal has to be maintained at 100Ω±15%. The SATA standard can be complied with by forming the shortest pattern length from the SATA signal terminal to the DSP terminal as described above.

The spindle motor connector 72 and the photosensor connector 74 are installed close to the driver IC 62 to face the driver IC 62 near the driver IC 62 at the front end side of the lower surface 18B of the main printed circuit board 18. A power supply pattern 124 is formed and connected from the power supply terminal 50A to the photosensor connector 74, and a power supply pattern 126 is formed and connected from the spindle motor connector 72 to the driver IC 62.

The spindle motor connector 72 is connected to an end of the flexible flat cable 78 (see FIG. 6). The other end of the flexible flat cable 78 The other end of is connected to the spindle motor 22A. The photosensor connector 74 is detachable and connected to an end of the flexible flat cable 80 (see FIG. 6). The flexible flat cable 80 is connected to the photosensor 27.

By arranging the spindle motor connector 72 and the photosensor connector 74 near the driver IC 62 the patterns from the driver IC 62 to those connectors can be shortened, thereby reducing noise occurrence.

Also referring to FIG. 3, the sub-printed circuit board connector 54 is installed on the upper surface 18A of the main printed circuit board 18. A voltage supply pattern is formed from the driver IC 62 to the sub-printed circuit board connector 54 using the lower surface 18B of the main printed circuit board 18. The sub-printed circuit board connector 54 is located facing the spindle motor connector 72 and the photosensor connecter 74 interposing the main printed circuit board 18. As can be understood from FIG. 7, the sub-printed circuit board connector 54 is located at a position corresponding to an approximately intermediate point between the spindle motor connector 72 and the photosensor connector 74. It is preferable to arrange the connectors in the board to concentrate them closer to the driver IC 62 as above, and to this end, both faces of the board may be efficiently utilized.

The spindle motor connector 72 and the photosensor connector 74 are provided on the lower surface 18B of the main printed circuit board 18 and the loading connector 54 for optical discs is provided on the upper surface 18A of the main printed circuit board 18, for the following reason. As described above, the carrier mechanism 11 moves, according to the loading mechanism 13 loading an optical disc, up and down in the direction along the height of the disc device. As can be understood from FIG. 5, the flat cables 78 and 80 respectively connected to the spindle motor connector 72 and the photosensor connector 74 also move up and down according to the carrier mechanism 11's movement. At that moment, the flat cable 52 (see also FIG. 3) that connects the sub-printed circuit board 19 to the main printed circuit board 18 is located above the flat cables 78 and 80. Accordingly, the flat cables 78 and 80 can be prevented from accidentally touching the flat cable 52 by setting the length of the flat cables 78 and 80 so that the carrier mechanism 11 chucks an optical disc to the spindle motor 22A, thereby preventing unintended degradation of the flat cables or connectors.

All arrangements for the control ICs and connectors in the main printed circuit board explained in the above embodiment are just examples, and may be changed as appropriate.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A disc device having a processing mechanism for executing recording or reproduction processing on a disc, the processing mechanism comprising:

a control hoard on which a driver IC for driving a mechanism motor and a main control IC for executing main processing concerning the recording or reproduction processing on the disc are installed; and a SATA connector having a power supply unit and a signal unit, the SATA connector being connected to the driver IC and the main control IC and placed on the control board opposite the main control IC;

wherein a pattern that connects the power supply unit to the driver IC and a pattern that connects the signal unit to the main control IC are formed on the control board;

wherein the SATA connector and the main control IC are placed on the driver IC side with respect to a line passing through the center of the control board, the power supply unit is placed on the driver IC side, and the signal unit is placed on the main control IC side; and wherein in the control board, a voltage regulator and a flash memory are installed; the main control IC is placed at almost the center of the control board; the flash memory and the voltage regulator are placed on opposite sides with respect to the main control IC; and the driver IC is placed on the same side as the flash memory and at a position opposite the voltage regulator.

2. A disc device having a processing mechanism for executing recording or reproduction processing on a disc, the processing mechanism comprising:

a control board on which a driver IC for driving a mechanism motor and a main control IC for executing main processing concerning the recording or reproduction processing on the disc are installed; and a SATA connector having a power supply unit and a signal unit, the SATA connector being connected to the driver IC and the main control IC and placed on the control board opposite the main control IC;

wherein a pattern that connects the power supply unit to the driver IC and a pattern that connects the signal unit to the main control IC are formed on the control board;

wherein the SATA connector and the main control IC are placed on the driver IC side with respect to a line passing through the center of the control board, the power supply unit is placed on the driver IC side, and the signal unit is placed on the main control IC side; and wherein plural connectors connected to the power supply unit directly or via the driver IC are placed in a concentrated manner near the driver IC on the same side as the driver IC in the control board, using both faces of the control board.

3. The disc device according to claim 2, wherein a connector for a photosensor that detects a pattern formed on a label side of an optical disc is placed near the driver IC on the control board.

4. The disc device according to claim 3, wherein the processing mechanism also comprises:
   a carrier mechanism having a spindle motor as the mechanism motor for rotating an optical disc, an optical pickup for executing recording or reproduction processing on the optical disc, and a carrier motor for moving the optical pickup towards or away from the optical disc, each being fixed to a chassis; and
   a loading mechanism for carrying a tray that receives the optical disc into the disc device;
   wherein the carrier mechanism is designed to move the optical disc carried into the disc device upward relative to the tray to fix the optical disc to the spindle motor; and
   a connector for the spindle motor and the photosensor connector are placed on the lower surface of the control board, and a connector for the loading mechanism is placed on the upper surface of the control board.

5. A disc device having a processing mechanism for executing recording or reproduction processing on a disc, the processing mechanism comprising:
   a control board on which a driver IC for driving a mechanism motor and a main control IC for executing main processing concerning the recording or reproduction processing on the disc are installed; and
   a SATA connector having a power supply unit and a signal unit, the SATA connector being connected to the driver IC and the main control IC and placed on the control board opposite the main control IC;
   wherein a pattern that connects the power supply unit to the driver IC and a pattern that connects the signal unit to the main control IC are formed on the control board;
   wherein the SATA connector and the main control IC are placed on the driver IC side with respect to a line passing through the center of the control board, the power supply unit is placed on the driver IC side, and the signal unit is placed on the main control IC side; and
   wherein the SATA connector is placed on the control board so that a pattern from the signal unit to the main control IC becomes a straight line along a line passing through the center of the control board.

\* \* \* \* \*